(12) United States Patent
Liu et al.

(10) Patent No.: US 9,021,810 B2
(45) Date of Patent: May 5, 2015

(54) FOSSIL-FUEL-FIRED POWER PLANT

(71) Applicant: The University of Kentucky Research Foundation, Lexington, KY (US)

(72) Inventors: Kunlei Liu, Lexington, KY (US); James K. Neathery, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 166 days.

(21) Appl. No.: 13/741,439

(22) Filed: Jan. 15, 2013

(65) Prior Publication Data

US 2013/0192230 A1    Aug. 1, 2013

Related U.S. Application Data

(60) Provisional application No. 61/632,657, filed on Jan. 27, 2012.

(51) Int. Cl.
| | |
|---|---|
| F01K 23/06 | (2006.01) |
| B01D 53/14 | (2006.01) |
| F25D 17/06 | (2006.01) |
| F01K 13/00 | (2006.01) |
| F01K 17/00 | (2006.01) |

(52) U.S. Cl.
CPC ............... *F01K 13/006* (2013.01); *F01K 17/00* (2013.01)

(58) Field of Classification Search
None
See application file for complete search history.

(56) References Cited

U.S. PATENT DOCUMENTS

| | | | |
|---|---|---|---|
| 3,897,227 A | 7/1975 | Giammarco et al. | |
| 5,203,161 A | 4/1993 | Lehto | |
| 6,784,320 B2 | 8/2004 | Mimura et al. | |
| 6,804,964 B2 | 10/2004 | Bellows et al. | |
| 6,837,056 B2 | 1/2005 | Potnis et al. | |
| 7,074,258 B2 | 7/2006 | Collins et al. | |
| 7,377,967 B2* | 5/2008 | Reddy et al. | 96/242 |
| 7,390,353 B2 | 6/2008 | Deen et al. | |
| 8,038,773 B2 | 10/2011 | Ochs et al. | |
| 8,104,259 B2 | 1/2012 | Joshi et al. | |
| 8,287,626 B2* | 10/2012 | Hoang-Dinh et al. | 95/174 |
| 8,500,865 B2* | 8/2013 | Bouillon et al. | 95/181 |
| 2003/0033821 A1* | 2/2003 | Maisotsenko et al. | 62/94 |
| 2008/0127831 A1* | 6/2008 | Rochelle et al. | 96/181 |
| 2011/0052453 A1* | 3/2011 | McLarnon et al. | 422/170 |
| 2011/0219777 A1* | 9/2011 | Wijmans et al. | 60/772 |
| 2011/0220744 A1* | 9/2011 | Zhao et al. | 241/18 |
| 2012/0009114 A1 | 1/2012 | Chen et al. | |
| 2012/0247104 A1* | 10/2012 | Handagama et al. | 60/670 |
| 2013/0255496 A1* | 10/2013 | Zhang et al. | 95/179 |
| 2013/0305752 A1* | 11/2013 | Martin | 62/91 |

FOREIGN PATENT DOCUMENTS

| | | | |
|---|---|---|---|
| CN | 202393293 U | * | 8/2012 |
| JP | 56147609 A | | 11/1981 |
| JP | 5168845 A | | 7/1993 |
| JP | 2008111643 A | | 5/2008 |
| WO | WO92/21683 A1 | | 8/1995 |

* cited by examiner

*Primary Examiner* — Thomas Denion
*Assistant Examiner* — Steven D Shipe
(74) *Attorney, Agent, or Firm* — King & Schickli PLLC (57) ABSTRACT

A power plant includes a boiler, a stream turbine generator, a post combustion processing system, a feed water regeneration processing system and a heat exchanger. Heat from the heat exchanger is used to regenerate (a) a reagent that absorbs carbon dioxide from flue gas and (b) a water-lean desiccant used to increase plant operating efficiency.

12 Claims, 6 Drawing Sheets

FOSSIL-FUEL-FIRED POWER PLANT

This utility patent application claims the benefit of priority in U.S. Provisional Patent Application Ser. No. 61/632,657 filed on 27 Jan. 2012, the full disclosure of which is incorporated herein by reference.

TECHNICAL FIELD

This document relates to the power plant field and, more particularly, to a new and improved power plant that operates at improved efficiency with reduced carbon dioxide emissions.

BACKGROUND

Carbon dioxide emissions from power plants can be detrimental to the environment. In general, carbon dioxide emissions from coal-fired power plants may be reduced by increasing the overall plant efficiency, which in turn may be realized by (1) increasing the steam temperature and pressure; (2) reconfiguring the steam cycle from single reheat to double reheat; or (3) reducing the back pressure of the steam condenser. These steps, however, may be difficult to achieve in practice. For example, the steam temperature and pressure are limited by the temperature and stress that the current material used in steam production can withstand. Reconfiguring the steam cycle from single reheat to double reheat may require rearranging the heat surfaces inside the boiler in a complicated way, rendering the implementation difficult. Finally, the back pressure of the steam condenser depends on numerous factors such as the equipment sizes of the condenser and the cooling tower that recirculates cooling water, and the ambient air conditions, all of which need to be suitably adjusted.

Carbon dioxide emissions of fossil-fuel-fired power plants may be effectively reduced by capturing the carbon dioxide from the flue gas, and storing the captured carbon dioxide. It is known to capture carbon dioxide at high pressures in natural-gas purification, with an absorbing reagent such as an aqueous solvent. The flue gas in fossil-fuel-fired power plants, however, typically contains about 12% to about 14% of carbon dioxide, which is lower than that of the flue gas in natural-gas purification. The lower concentration of carbon dioxide in the flue gas of fossil-fuel-fired power plants reduces the driving force for the carbon dioxide absorption. Thus, a need exists for more effective capture of carbon dioxide from the flue gas of fossil-fuel-fired power plants.

Once the carbon dioxide is captured by being absorbed in the absorbing reagent, the absorbing reagent will need to be regenerated for continued use. The regeneration of the absorbing reagent takes energy, however, reducing the power output of the plant. To account for the reduced power output due to the regeneration of the absorbing reagent, there has developed a need for a power plant with an increased power output.

SUMMARY

In accordance with the purposes and advantages noted herein a power plant is provided comprising a boiler, a steam turbine and a post-combustion processing system. The boiler is configured to receive fuel, feed water and an air stream. The boiler combusts the fuel vaporizing the feed-water into steam and discharges a flue gas that includes carbon dioxide. The steam turbine is configured to receive the steam and use that steam to drive a load. The steam turbine discharges spent steam. The post-combustion processing system is configured to process the flue gas.

The post-combustion processing system includes a carbon dioxide scrubber, a primary stripper and a secondary stripper. The carbon dioxide scrubber receives the flue gas from the boiler and contacts the flue gas with a reagent that absorbs carbon dioxide to form a spent absorbent reagent. The primary stripper receives the spent absorbent reagent and strips at least a portion of the carbon dioxide from the spent absorbent reagent to form a first regenerated reagent. The secondary stripper receives the first regenerated reagent and strips at least a portion of the carbon dioxide from the first regenerated reagent to form a second regenerated reagent. The secondary stripper has a first line to return the second regenerated reagent to the carbon dioxide scrubber to be recycled as the reagent and a second line to return at least a portion of the carbon dioxide stripped from the first regenerated reagent to the air stream received by the boiler.

In accordance with an additional aspect, the secondary stripper is configured to receive ambient air of the power plant and to contact the first regenerated reagent with the ambient air thereby stripping at least a portion of the carbon dioxide from the first regenerated reagent. Further the primary stripper is connected to a reboiler that is configured to vaporize the spent absorbent reagent into reagent steam and supply the reagent steam to the primary stripper. The primary stripper is configured to receive the reagent steam and contact the spent absorbent reagent with the reagent steam whereupon at least a portion of the carbon dioxide is stripped from the spent absorbent reagent thereby forming the first regenerated reagent.

Still further the power plant includes a stripper heat recovery unit that receives the first regenerated reagent and vapors evolved from the primary stripper whereby heat is recovered from those vapors in the first regenerated reagent. In addition the power plant includes a compressor. The compressor receives the vapors from the primary stripper and compresses the vapors for downstream utilization or sequestration. Still further the power plant includes a rich-lean crossover heat exchanger between the primary stripper and the secondary stripper. The rich-lean crossover heat exchanger exchanges heat between the spent absorbent reagent and the first regenerated reagent.

In accordance with yet another aspect, the power plant includes a condenser, at least one heat exchanger, and a cooling tower. The condenser is configured to receive spent steam and coolant and functions to condense the spent steam to form feed water while warming the coolant. The heat exchanger exchanges heat that is associated with one or more processes of the power plant. The cooling tower receives warm coolant, cooling air that includes moisture and a water-lean desiccant. The cooling tower contacts the water-lean desiccant with the cooling air thereby stripping at least a portion of the moisture from the cooling air to form dry cooling air and a water rich desiccant. The dried cooling air contacts and cools the warm coolant while the water rich desiccant is discharged to the heat exchanger and heated at the heat exchanger to form a water-lean desiccant which is returned to the cooling tower.

Still further describing the power plant, the stripper heat recovery unit receives the first regenerated reagent, water-rich desiccant from the cooling tower and vapors evolved from the primary stripper so that heat is recovered from the vapors in the first regenerated reagent and the water rich desiccant. In addition the power plant includes a water-lean desiccant regeneration unit. The water rich desiccant is directed serially from the cooling tower through the stripper heat recovery unit and the water-lean desiccant regeneration unit where water is removed from the water rich desiccant to form the water lean desiccant that is then returned to the cooling tower. The water lean desiccant regeneration unit includes a scavenging air inlet. In one possible embodiment the scavenging air inlet is connected to a source of flue gas or combustion gas to provide heating of the water-rich desiccant.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

It should be understood that the power plant is not limited in its application to the details of construction and the arrangements of the components set forth in the following description or illustrated in the above-described drawings. The power plant is capable of other embodiments and of being practiced or being carried out in various ways. Also, it is to be understood that the phraseology and terminology used herein is for the purpose of description and should not be regarded as limiting.

DETAILED DESCRIPTION

Figure 1:
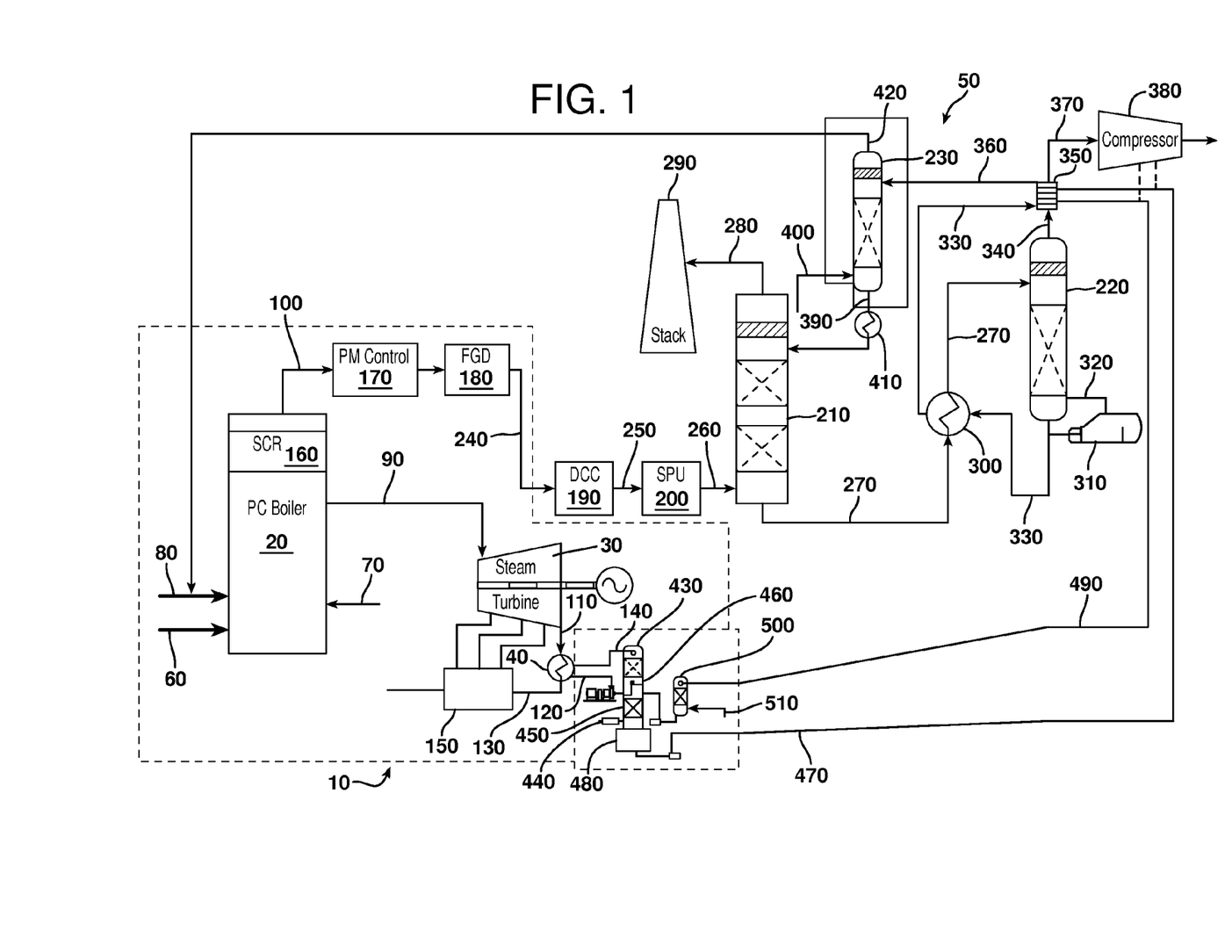
FIG. 1 is a schematic illustration of a power plant according to one embodiment.

FIG. 1 is a schematic illustration showing an exemplary coal-fired power plant 10 with improved systems for capturing carbon dioxide ($CO_2$) from flue gases. The power plant 10 generally includes a boiler 20, a steam turbine 30, a condenser 40, and a post-combustion processing system 50. The boiler 20 is configured to receive fuel 60, feed-water 70 and an air stream 80, to combust the fuel 60 thereby vaporizing the feed-water 70 into steam 90, and to discharge a flue gas 100 that includes $CO_2$. The steam turbine 30 is configured to receive the steam 90. The steam 90 drives a load, such as an electric generator, and the steam turbine 30 discharges spent steam 110. The condenser 40 is configured to receive the spent steam 110 and a coolant 120, whereupon the spent steam 110 is condensed to form a condensed feed-water 130, and the coolant 120 is warmed to form a warmed coolant 140. The condensed feed-water 130 is heated up via feed water heaters and economizers 150, and subsequently fed back to the boiler 20, thereby completing the steam cycle.

After the coal is combusted in the boiler 20, flue gas 100 leaves the boiler 20 where it may be treated in a selective catalytic reduction (SCR) reactor 160 to remove $NO_x$. After the SCR reactor 160, the flue gas further may be treated in a particulate matter (PM) control device 170 to remove fly ash. In some embodiments, the PM control device 170 may be an electrostatic precipitator. The flue gas then may travel through one or more flue-gas desulfurization (FGD) devices or $SO_2$ scrubbers 180 to remove $SO_2$, and may enter the post-combustion processing system 50.

The post-combustion processing system 50 may be configured to further process the flue gas, and may include one or more of a direct contact cooler (DCC) 190 for cooling the flue gas with water, a pre-treatment unit or sulfur polishing unit (SPU) tower 200 for polishing fly gas and sulfur containments, a $CO_2$ scrubber 210, a primary stripper 220, and a secondary stripper 230. Although FIG. 1 illustrates the post-combustion processing system 50 on a power plant 10 with a steam cycle, other constructions may be utilized on a power plant without a steam cycle. The post-combustion processing system 50 may capture carbon dioxide from the flue gas 100 at a fraction of the energy penalty compared to competing process designs. Moreover, the post-combustion processing system 50 may improve the back pressure of the steam turbine.

After the FGD device 180, the flue gas may enter a forced draft fan, which may boost the pressure of the flue gas to overcome a pressure drop occurring inside the downstream post combustion processing system 50. At this point, the flue gas may be saturated with water at a temperature between about 50-60° C., such as about 55° C. For example, the water content of the flue gas may be between about 15-25 by volume (e.g., about 18% by volume), and the $CO_2$ concentration may be between about 10-20% of the total flue-gas stream (e.g., about 14% of the total flue-gas stream). The pressurized flue gas 240 may proceed through the Direct Contact Cooler (DCC) 190, which a water spray system with liquid collection at bottom for recirculation. The Direct Contact Cooler (DCC) 190 may cool and dehumidify the pressurized flue gas 240 to between about 30-40° C. for downstream water management. At this point, the $SO_2$ concentration in the flue gas may be between about 50-70 ppm, (e.g., about 60 ppm). The cooled flue gas 250 then may enter the $SO_2$ Polishing Unit (SPU) 200, which is a counter-flow pre-treatment tower. The $SO_2$ Polishing Unit (SPU) 200 may use a diluted caustic solution to remove $SO_2$ and other gaseous containments from the cooled flue gas 250, and may polish the cooled flue gas 250 to less than about 10 ppm of $SO_2$, to minimize the formation of heat-stable salts.

The $SO_2$-polished flue gas 260 may enter the $CO_2$ scrubber 210, which may receive the flue gas 260 and may contact the flue gas 260 with a reagent that absorbs $CO_2$ to form a spent absorbent reagent or solution 270 and a $CO_2$-depleted flue gas 280. The $CO_2$-depleted flue gas 280 may be treated in a solvent recovery column or stack 290. At this point, the $CO_2$-depleted flue gas 280 may be saturated with water at a temperature of between about 35-45° C. (e.g., about 40° C.). Meanwhile, the reagent in the $CO_2$ scrubber 210 may absorb $CO_2$ by converting gaseous $CO_2$ into aqueous carbon species, such as by the following reactions [1] and [2]:

$$SC1 + CO_2 \rightarrow SC1\text{-}COO^- + H^+ \quad [1]$$

$$SC2 + H_2O + CO_2 \rightarrow SC2\text{-}HCO_3^- + H^+ \quad [2]$$

where SC1 may represent constituents of primary and secondary amines in the solvent or reagent, and SC2 may represent constituents of tertiary amines in the solvent. The spent absorbent reagent 270, rich in carbon, may travel from the bottom of the $CO_2$ scrubber 210 and may be pressurized. Then, the spent absorbent reagent 270 may be sent to a rich-lean solution heat exchanger 300 for sensible heat recovery, before going to the primary stripper 220 for regeneration.

The primary stripper 220 may receive the spent absorbent reagent 270 at the top of the unit and may spray the spent absorbent reagent 270 downwardly. A reboiler 310 may be connected to the primary stripper 220. The reboiler 310 may be configured to receive the spent absorbent reagent 270 and vaporize the spent absorbent reagent 270 and water into a reagent steam 320. The reagent steam 320 may be supplied to the bottom of the primary stripper 220. In the packed column of the primary stripper 220, the spent absorbent reagent 270 may travel downwardly and may contact a countercurrent of the reagent steam 320. Upon contacting the reagent steam 320, the spent absorbent reagent 270 may be stripped of at least a portion of the $CO_2$, thereby forming a first regenerated reagent or solution 330 that is lean in carbon, such as by the following reactions [3] and [4]:

$$SC2\text{-}HCO_3^- + H^+ \rightarrow SC2 + H_2O + CO_2 \quad [3]$$

$$SC1\text{-}COO^- + H^+ \rightarrow SC1 + CO_2 \quad [4]$$

At the top of the primary stripper 220, a first exhaust vapor 340 consisting of $CO_2$ and water vapor may exit.

The first regenerated reagent 330 may be sent to the rich-lean solution heat exchanger 300, where it may be cooled to between about 35-45° C. (e.g., about 40° C.) by the spent absorbent reagent 270. Subsequently, the first regenerated reagent 330 may be sent to a first stripper heat recovery unit 350. Although FIG. 1 illustrates a post-combustion processing system 50 having a single stripper heat-recovery unit 350, some post-combustion processing systems may include one or more stripper heat-recovery units (see FIG. 4). The first stripper heat-recovery unit 350 may receive the first regenerated reagent 330 from the rich-lean solution heat exchanger 300, and also may receive the first exhaust gas 340 from the primary stripper 220. At the first stripper heat-recovery unit 350, the first regenerated reagent 330 may be heated to form a reheated first regenerated reagent 360, and the first exhaust gas 340 may be cooled to condense at least the water vapor therein to form an exhaust solution 370. The exhaust solution 370, enriched in $CO_2$, may be pressurized, intercooled, and compressed at a compressor 380 to a pressure of between about 10-20 MPa (e.g., about 14 MPa) for downstream utilization or sequestration.

As illustrated in FIG. 1, the post-combustion processing system 50 may further include a secondary stripper 230 for receiving the reheated first regenerated reagent 360 and stripping at least a portion of the $CO_2$ from the reheated first regenerated reagent 360 to form a second regenerated reagent 390. Similar to the primary stripper 220, the secondary stripper 230 may be a packed column. The secondary stripper 230 may receive the reheated first regenerated reagent 360 at the top of the unit, and an air-based sweeping stripper or stripping gas 400 at the bottom of the unit. The air 400 used for stripping in the secondary stripper 230 may come at least in part from ambient air of the power plant 10. Before entering the secondary stripper 230, the air 400 may be preheated in an air preheater (not shown). Inside the secondary stripper 230, the air 400 may contact the reheated first regenerated reagent 360, thereby stripping at least a portion of the $CO_2$ from the reheated first regenerated reagent 360 and forming the second regenerated reagent 390, such as by the following reaction [5]:

$$SC1\text{-}COO^- + H^+ \rightarrow SC1 + CO_2 \quad [5]$$

The second regenerated reagent 390 may exit the secondary stripper 230 at an outlet at the bottom of the unit, and may be sent to a second stripper heat recovery unit 410 before being returned to the $CO_2$ scrubber 210 to be recycled as the reagent. As explained further below, the second stripper heat recovery unit 410 may facilitate heating the condensed feed-water 130. At the top of the secondary stripper 230, a second exhaust gas 420 consisting of air, water vapor, and $CO_2$ may exit. The second exhaust gas 420 may be returned to the boiler 20 as secondary air, so that at least a portion of the $CO_2$ stripped from the reheated first regenerated reagent 360 may be returned to the air stream 80.

Figure 2:
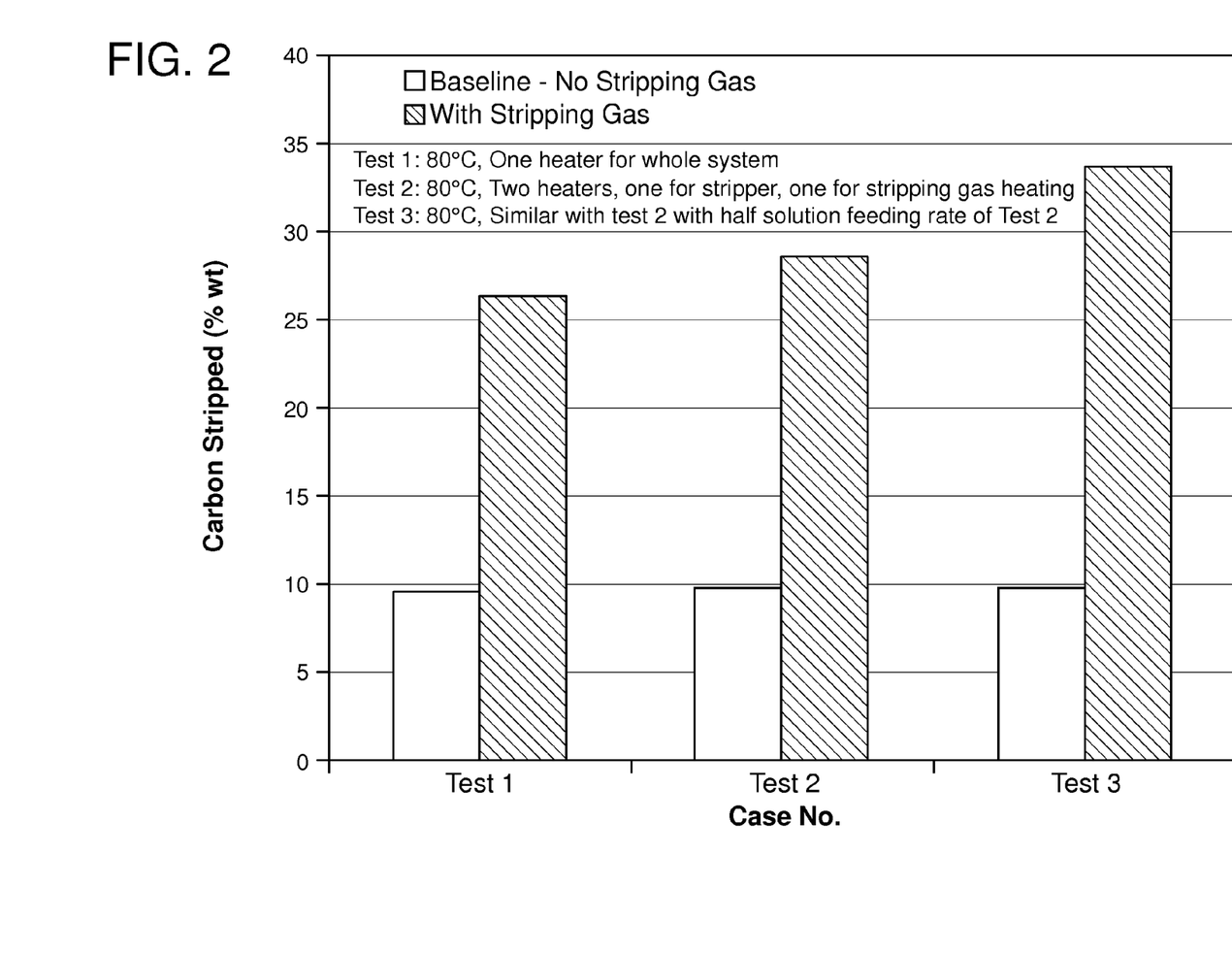
FIG. 2 is a graph plotting the carbon stripped as a function of various parameters of the stripping gas for an embodiment of a power plant as described herein, including, for example, the power plant of FIG. 1.

FIG. 2 illustrates the impact of the stripping gas 400 in the secondary stripper 230. At a column-operating-temperature of about 80° C., the addition of stripping gas 400 into the column of the secondary stripper 230 results in stripping an additional 25% of $CO_2$ from the reheated first regenerated reagent 360 compared to the reference case with no stripping gas. In both the reference case and the test case, monoethanolamine was used as the reagent.

Referring again to FIG. 1, the power plant 10 may include a feed water regenerator system 435 including a first heat-integrated cooling tower 430 adapted to strip at least a portion of the moisture from the air at the inlet of the cooling tower 430, thereby increasing the power output of the power plant 10. As discussed above, the condenser 40 may be configured to receive the spent steam 110 and a coolant 120, whereupon the spent steam 110 may be condensed to form a condensed feed-water 130, and the coolant 120 may be warmed to form a warmed coolant 140. The cooling tower 430 may receive at a top section the warmed coolant 140 from the condenser 40, and at a bottom section cooling air 440 that includes moisture, and a desiccant 450. Inside the cooling tower 430, the cooling air 440 may contact the desiccant 450, and the cooling air 440 may be stripped of at least a portion of the moisture, thereby forming a dried cooling air 460 and a water-rich desiccant 470. The dried cooling air 460 may travel to a top section of the cooling tower 430, thereby contacting and cooling the warmed coolant 140, which then may be recycled as the coolant 120. The water-rich desiccant 470 initially may be collected at a reservoir 480 positioned at the bottom of the cooling tower 430, and subsequently may be pumped or discharged to the first stripper heat-recovery unit 350. At the first stripper heat-recovery unit 350, the water-rich desiccant 470 may be heated to form a heated water-rich desiccant 490. Optionally, the water-rich desiccant 470 also may be heated at the compressor 380. The heated water-rich desiccant 490 may be returned toward the cooling tower 430.

Figure 3:
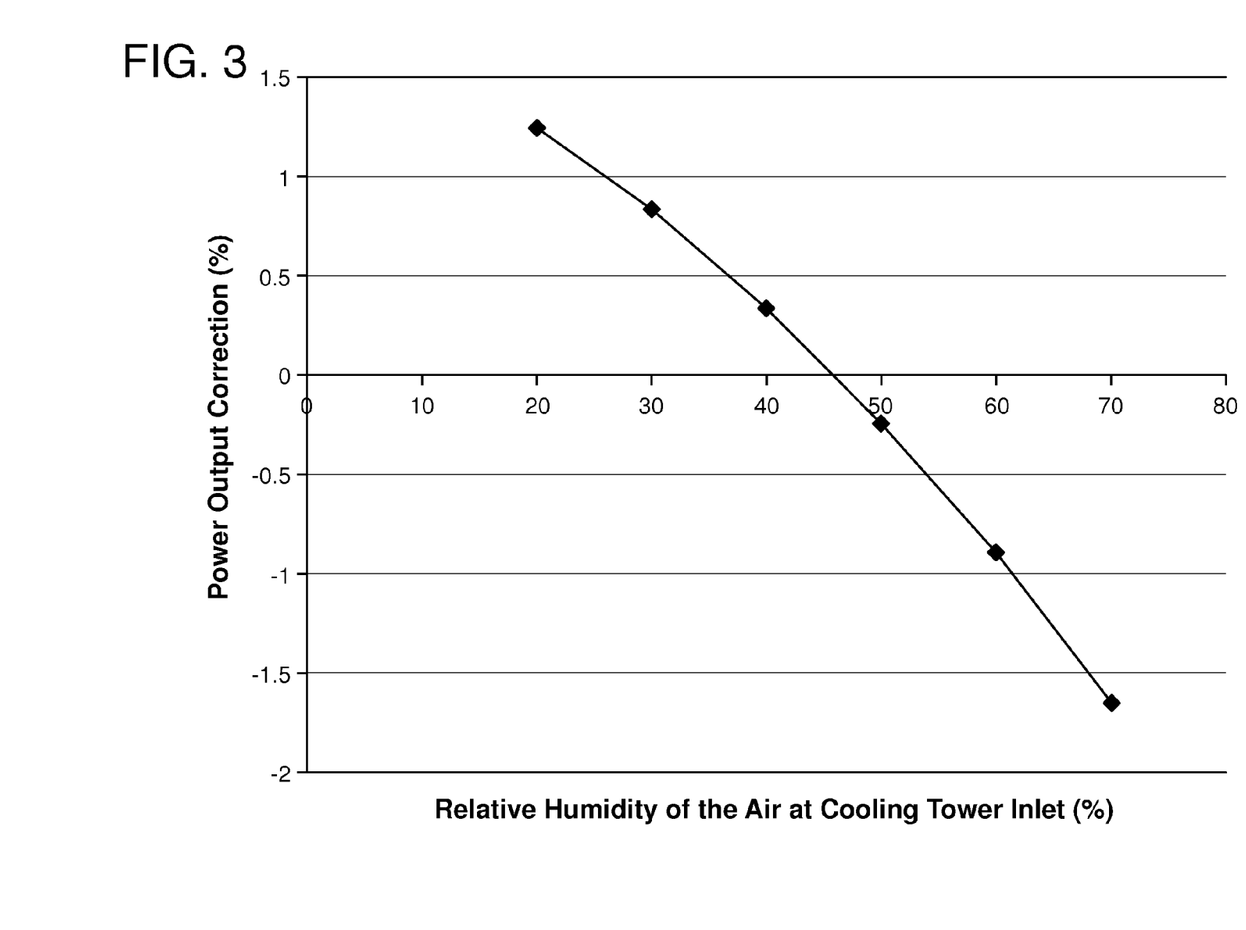
FIG. 3 is a graph plotting the power output correction as a function of the relative humidity of the air at the cooling tower inlet for an embodiment of a power plant as described herein, including, for example, the power plant of FIG. 1.
Figure 4:
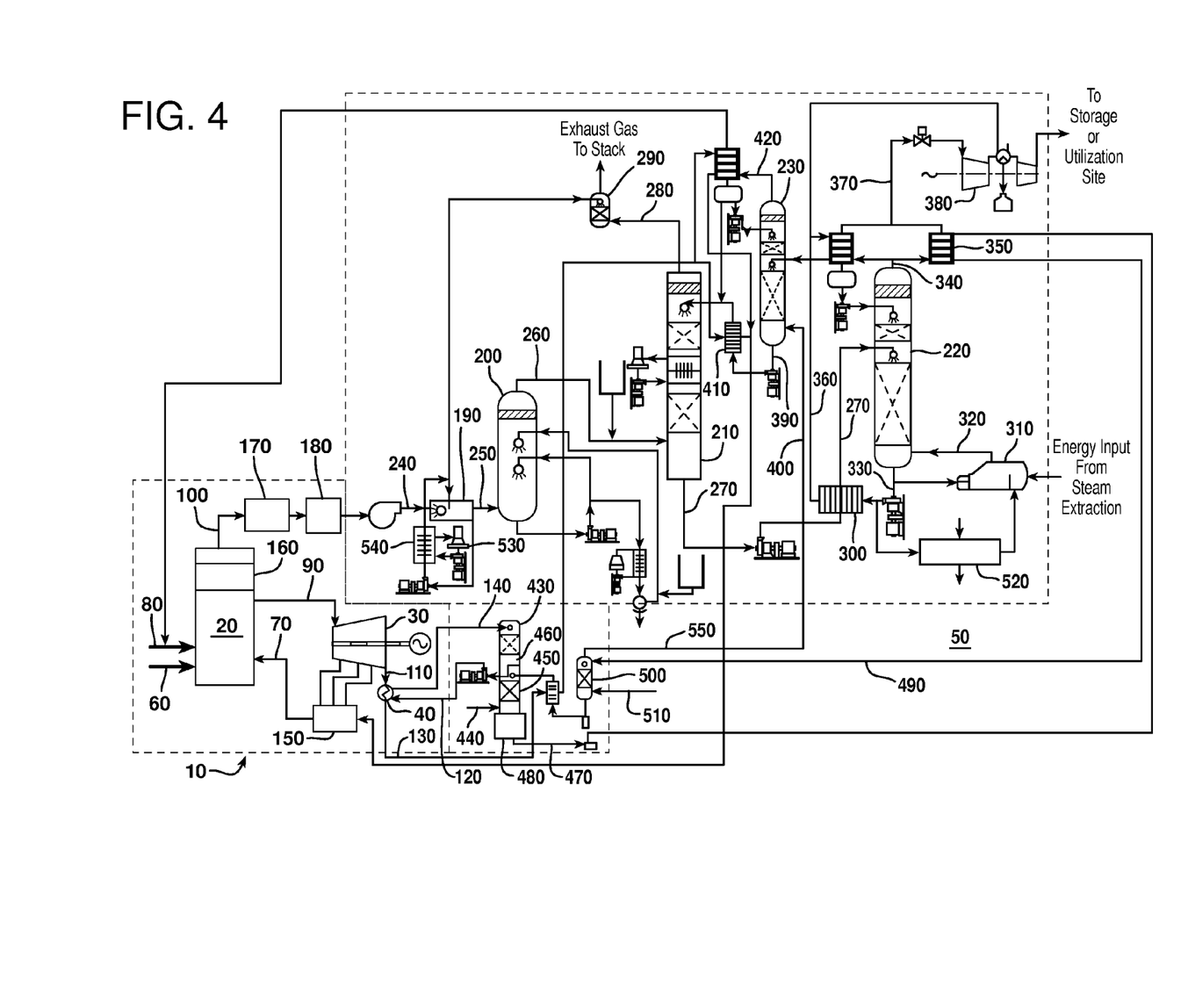
FIG. 4 is a schematic illustration of a power plant according to another embodiment.

Referring to FIG. 3, the plotted line represents a power-correction factor calculated at various relative humidity levels of the air at the cooling tower, all at a given ambient temperature. The temperature of the cooling water in a close-loop cooling tower system can depend on the ambient seasonal conditions, specifically the ambient temperature and relative humidity. During warm summer months, the relative humidity of the air at the inlet of a cooling tower generally will be increased. This reduces the evaporative cooling effect of the air, which in turn results in a higher cooling water temperature. The condenser pressure will then increase, and ultimately the boiler steam output may be derated. A power-correction factor of zero means that the boiler steam output performs according to the baseline design conditions of the boiler manufacturer. In FIG. 4, this occurs at a relative humidity of between about 40-50% (e.g., about 45%). If the relative humidity or air wet-bulb temperature can be lowered, an increase in power output can be obtained for the power plant. In contrast, an increase in relative humidity, all other things being equal, will result in a loss of power output for the power plant. The first heat-integrated cooling tower 430 is adapted to lower the relative humidity of the air at the inlet of the cooling tower 430, thereby increasing the power output of the power plant 10.

The cooling tower 430 may suitably reduce the back pressure of the condenser 40. A relatively small change in the pressure of the condenser 40, for example in the order of hundreds of pascals, can bring about surprisingly large changes in plant efficiency. Although the back pressure of the steam condenser 40 may depend on additional factors, such as the equipment sizes of the condenser 40 and the cooling tower 430, once the equipment sizes are determined, the availability of the recirculating coolant 120 for heat rejection may be a major factor governing the pressure of the condenser 40, and ultimately the performance of the power plant 10. In particular, the temperature and quantity of the coolant 120 available to the condenser 40 can have a significant impact on the performance. The precise impacts of the temperature of the coolant 120 on the pressure of the condenser 40, and the associated impact on the efficiency of the power plant 10, may be site-specific. Nevertheless, in general, the pressure of the condenser 40 may be reduced by about 350 to 680 Pa per every reduction of 1° C. in the temperature of the coolant 120. The associated impact on the power plant 10 may be a decrease of heat consumption in the order of about 0.1% per 100 Pa of pressure reduction. Thus, a decrease of about 5° C. in the temperature of the coolant 120 might decrease the heat consumption of the power plant 10 by around 1%.

In some aspects, power plants according to the present disclosure may regenerate the water-rich desiccant 470 with waste heat of the power plant 10. Waste heat that is released into the environment, such as exhaust gases from turbines and engines and waste heat from cooling water of industrial plant heat exchangers, is typically classified as low-grade heat sources and is difficult to recover in a power plant environment. For example, waste heat from a stream with a temperature of less than about 120° C. is considered of a low grade and not suitable for reuse or recycling. Thus, heat loss or rejection from condensing heat exchangers used in carbon capture processes could be a major source of steam plant efficiency loss. According to the present disclosure, however, the heat at the first stripper heat recovery unit 350 or the compressor 380, among other locations, which otherwise may be wasted, suitably may be used to heat the water-rich desiccant 470 for subsequent regeneration of the water-lean desiccant.

Suitable compounds for use as the desiccant 450 may include, but are not limited to, glycol and aqueous brine solutions of calcium chloride ($CaCl_2$) or lithium chloride (LiCl). Glycols have a chemical affinity for water. In a glycol dehydration process, a glycol solution including diethylene glycol or triethylene glycol is brought into contact with the wet gas stream, and the glycol solution absorbs water from the wet gas. The glycol solution may be regenerated by heating the water-laden desiccant. Compared to brine solutions with $CaCl_2$ or LiCl, a glycol solution is less corrosive. However, glycol has a significant vapor pressure at typical regeneration temperatures, which means that significant amounts of glycol may evaporate during regeneration. On the other hand, brine solutions with $CaCl_2$ or LiCl have a lower vapor pressure and therefore may be regenerated at high temperatures with substantially no loss of the $CaCl_2$ or LiCl.

Power plants according to this disclosure further may include a water-lean desiccant regeneration unit 500 for receiving the heated water-rich desiccant 490 and a scavenging air-stream 510. The scavenging airstream 510 may come, at least in part, from the combustion air or flue gas of the power plant 10. Upon entering the regeneration unit 500, the water-rich desiccant 490 is further heated with heat supplied from the scavenging air-stream 510 and thereby may be stripped of at least a portion of the water before being returned to the cooling tower 430.

Figure 6:
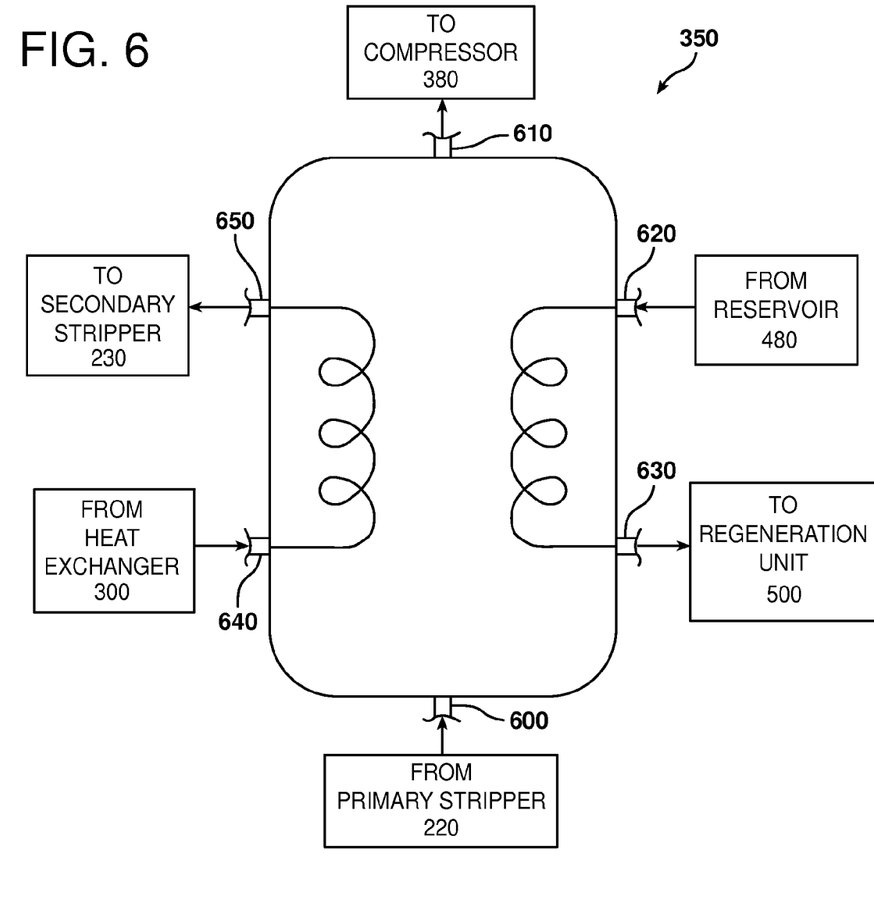
FIG. 6 is a detailed schematic illustration of the first stripper heat recovery unit.

In the illustrated embodiment, the stripper heat recovery unit 350 includes a primary stripper vapor inlet 600, an exhaust solution outlet 610, a water-rich desiccant inlet 620, a heated water-rich desiccant outlet 630, a first regenerated reagent inlet 640 and a reheated first regenerated reagent outlet 650 (see FIG. 6). Thus, heat from the primary stripper vapor 340 is advantageously recovered in both the heated water-rich desiccant 490 and the reheated first regenerated reagent 360. Illustrative embodiments of the power plant are described in greater detail below.

EXAMPLE 1

FIG. 4 illustrates an exemplary power plant 10 according to this disclosure. The post combustion processing or carbon capture and storage system 50 of FIG. 4 includes the direct contact flue gas cooler (DCC) 190, the pretreatment tower 200, a packed column scrubber 210 with a solvent-recovery column 290, two packed-bed strippers 220, 230 with one reboiler 280 and reclaimer 520, and the balance of plant including heat exchangers, pumps, and a filtration device to remove precipitates from the pretreatment tower 200.

After the $SO_2$ scrubber 180, the flue gas enters a forced draft fan to overcome downstream pressure drop. At this point, the flue gas is saturated with water at a temperature of approximately 55° C., water content of 17 vol %, and $CO_2$ concentration around 15.8% by volume of the total wet gas stream. The flue gas proceeds through the direct water contactor 190, which is a water spray system with liquid collection at bottom. The cooling water in the DCC 190 is cooled using a second heat-integrated cooling tower 530. Inside the DCC 190, the flue gas is cooled to 30° C. for downstream water and scrubber temperature management. At this point, the $SO_2$ concentration in the flue gas is around 41 ppm. Excess water from the direct water contactor 190 is pumped to the FGD 180 as makeup water and to the carbon capture and storage components 50 for solvent recovery and emission control. The cooled flue gas 250 then enters a counter-flow pre-treatment tower 200 that uses a dilute caustic solution for removing $SO_2$ and other gaseous contaminants. The pretreatment tower 200 polishes the flue gas to a level of $SO_2$ that minimizes solvent degradation. The temperature of the spent solution will be reduced in a cooling device 540, resulting in crystallization of a portion of the sulfate product. The solid will be removed via filtration.

The $SO_2$-polished flue gas 260 then enters the counter current flow $CO_2$ scrubber 210 with an intercooling heat exchanger to react with the carbon-lean aqueous amine solvent. The $CO_2$-depleted flue gas 280 then will be treated in the solvent recovery column 290 using water from the direct water contactor 190 to remove any residual solvent if a high-volatility solvent is used. At this point, the flue gas 280 is water saturated at approximately 42° C. After gaseous $CO_2$ is converted into aqueous carbon species, the carbon-rich solution 270 exits the bottom of the scrubber 230, is pressurized, and is sent to the rich-lean solution heat exchanger or crossover EHX 300 prior to the stripper 220.

After the crossover EHX 300, the carbon-rich solution 270 is sent to the pressurized, packed, primary stripper 220 for solvent regeneration. This stage may require an external energy source to drive the steam reboiler 310. At the exit of the primary stripper 220, the gas stream 340 primarily consists of $CO_2$ (60% by volume) and water vapor (40% by volume) at a pressure of approximately 300,000 Pa and a temperature of approximately 100° C. After exiting the heat recovery unit 350, the $CO_2$-enriched gas stream 340 will be pressurized to about 13.5 MPa and intercooled for downstream utilization or sequestration.

The carbon-lean solution 330 exiting the primary stripper 220 is sent to the crossover EHX 300, where the heat will be recovered with the carbon-rich solution 270. After the crossover EHX 300, this heat-depleted stream will first enter another heat recovery unit 354, cooling the gas stream 340 that is exiting the primary stripper 220, for energy recovery. The gas stream 340 consists mainly of water vapor. The reheated lean stream 360 will then be sent to the top of an ambient pressure air-sweeping, packed column or secondary stripper 230 to drop the carbon loading further in the lean solution 360. Finally, it will be cooled to approximately 40° C. by the steam turbine condensate 130, cooling water 120, or both, and recycled to the scrubber 210. As will be explained further below, the water-saturated air 400 used here comes from a liquid desiccant water evaporator 500. The $CO_2$-enriched exhaust gas 420 from an outlet of the secondary stripper 230 with a $CO_2$ content of approximately 1%-4% will be fed to an air preheater (not shown) and used as boiler combustion air 80.

At the first heat-integrated cooling tower 430, the ambient air 440 enters the cooling tower 430 at the bottom section where it contacts a liquid desiccant 450, reducing the water content of the liquid desiccant 450. The dried air 460 will enter the top section of the cooling tower 430 to cool the recirculating water 140 through evaporation. The water-rich liquid desiccant 470 will be collected at the bottom or reservoir tank 480 and preheated at the primary stripper condenser or compressor intercooler 350, before being sent to an air-blown evaporator 500 for regeneration. The heated water-rich desiccant 490 will be cooled by steam turbine condensate 120 and a chiller prior to the next cycle. A high-temperature exhaust air 550 saturated with moisture exits from the evaporator 500. The exhaust air 550 will be fed to the secondary stripper 230 for $CO_2$ removal.

EXAMPLE 2

Figure 5:
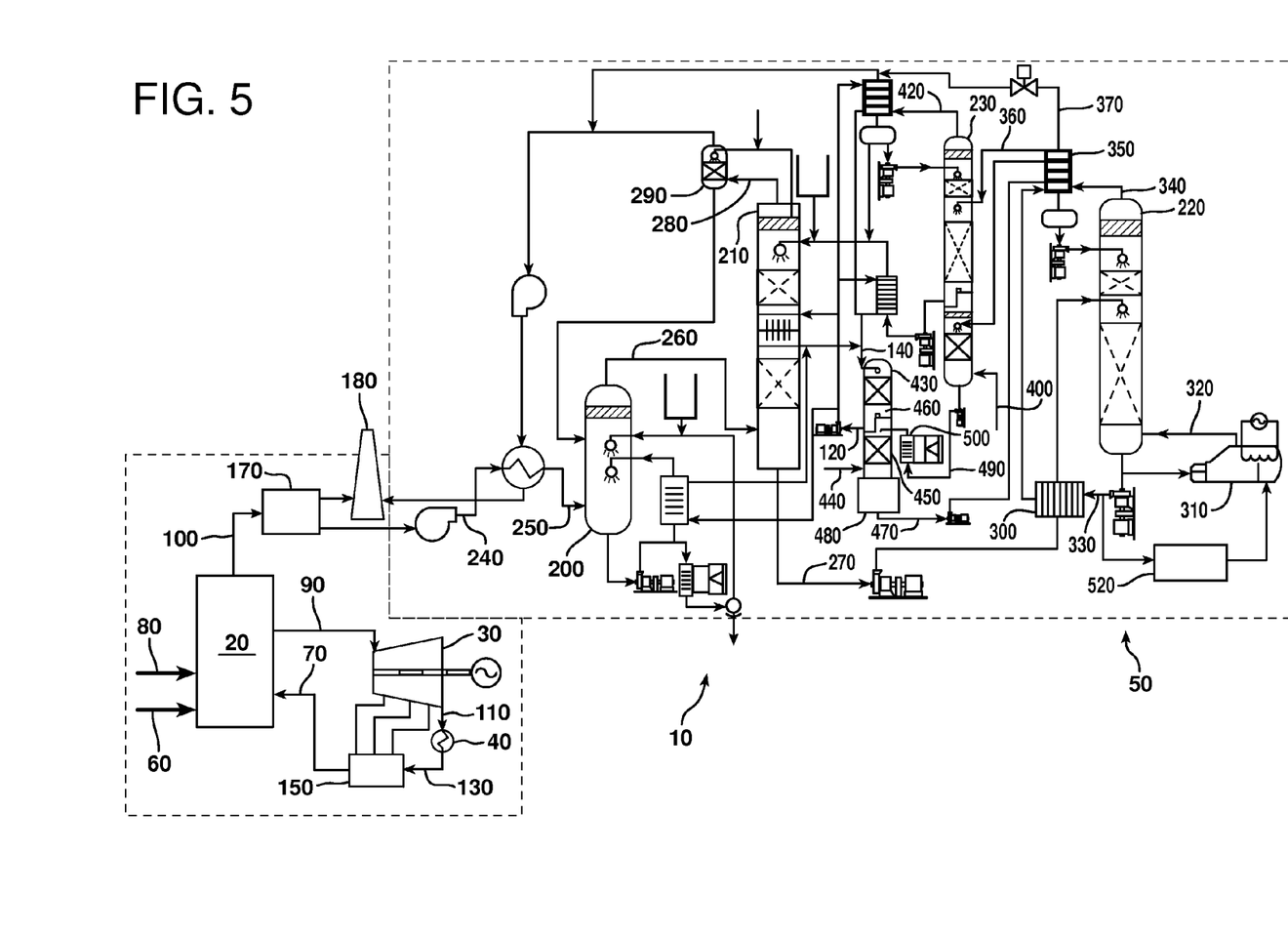
FIG. 5 is a schematic illustration of a power plant according to yet another embodiment.

FIG. 5 illustrates another exemplary power plant 10 according this disclosure. In FIG. 5, the flue gas is extracted prior to the FGD 180. An exemplary flue gas composition prior to the FGD 180 is listed in Table 1, along with the flue gas temperature, pressure, and gas flow.

TABLE 1

| $CO_2$ | % by vol. | 12.2 |
|---|---|---|
| $H_2O$ | % by vol. | 8.9 |
| $N_2$ | % by vol. | balance |
| $O_2$ | % by vol. | 5.1 |
| $NO_x$ at 6% $O_2$ dry | lb/mmBtu | 0.452 |
| $SO_2$ at 6% $O_2$ dry | ppmv | 1,110 |
| Flue gas temperature | ° F. | 300 |
| Flue gas spressure | psia | 14.8 |
| Flue gas flow to CCU | wet standard cubic feet per hour | 23,180,667 |

The $CO_2$ capture slipstream facility 50 of FIG. 5 consists of the following seven major components: (1) the pre-treatment tower 200 with an in-situ cooling coil; (2) the $CO_2$ absorber 210 with intermediate cooling, (3) the solvent recovery column 290, (4) the cross-over rich-lean solution heat exchanger 300, (5) the primary stripper 220 with the reboiler 310, the reclaimer 520, and the heat recovery unit 350 at its outlet, (6) the secondary air stripper 230 with the heat exchanger 350, and (7) the first heat-integrated cooling tower 430. The reboiler 310 is driven by electricity for solvent regeneration and reclaiming. A refrigerated chiller 560 is included to precipitate the sulfate/sulfite salts from the pretreatment tower 200 and to tune the temperature of the liquid desiccant 490 returning to a bottom section of the cooling tower 430. Gaseous products from the process will re-enter the main power plant 10 prior to the FGD 180 and any impurities developed in the process (e.g., solvent slip or volatile degradation products) will be treated according to an environment, health & safety (EHS) plan. Waste from the reclaimer 520 and the pretreatment tower 200, and other solid and liquid waste will be disposed off-site as determined in the EHS plan.

The size of major components (column, heat exchanger), pumps and fans are given in Table 2. The total electricity required to run pumps and fans is 26 kWe. The solvent makeup rate is estimated at 1.4 gmol/h, the makeup water flow rate is 320 kg/h, and the solid waste stream rate is estimated at 16 kg/h from the pretreatment tower 200 and 0.3 kg/h from the reclaimer 520. The wastewater stream from the pretreatment tower 200 is 98 kg/h.

TABLE 2

| Name | Type | Dimension | Flowrate/Duty |
|---|---|---|---|
| Flue Gas-Gas EHX | Shell-Tube | 22" dia × 10' Length | 178,400 Btu/hr |
| Pretreatment Tower | Open Packed Column | 36" dia × 25' Ht | 2400 m³N/h, 7.6 kg/h $SO_2$ removal |
| $CO_2$ absorber | Structure Packed Column | 38" dia × 70' Ht | 2400 m³N/h, 880 kg/h $CO_2$ Captured |
| Solvent Recovery Column at $CO_2$ Absorber Outlet | Structure Packed Column | 36" dia × 14' Ht | 6.2 MM Btu/hr |
| Cross-over EHX | Frame-Plate | 25"W × 48"L × 77"H | 880 kg/h $CO_2$ Released |
| Reboiler | Electric heated hot oil system | 24" dia × 15' L | 3.3 MM Btu/hr |
| Reclaimer | Electric heated hot oil system | 16" × 6'Length | |
| Air Stripper (AS) with Water Evaporator | Random Packed Column | 36" dia × 67' Ht | 200 kg/h $CO_2$ Released |
| Condenser at PS Outlet | Shell & tube | 20" dia × 8' L | |
| Condenser at AS Outlet | Frame-Plate | 24"W × 72"L × 87"H | |
| Main Recirculation Pump | | | 150 gpm |
| Integrated Cooling Tower | Open Packed Column | 90" dia × 50' Ht | |

It is understood that the invention may embody other specific forms without departing from the spirit or central characteristics thereof. The disclosure of aspects and embodiments, therefore, are to be considered as illustrative and not restrictive. While specific embodiments have been illustrated and described, other modifications may be made without significantly departing from the spirit of the invention. The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A power plant comprising:
a boiler configured to receive fuel, feed-water, and an air stream, to combust the fuel, vaporizing the feed-water into steam, and to discharge a flue gas that includes carbon dioxide;
a steam turbine configured to receive the steam wherein the steam drives a load and said steam turbine discharges spent steam; and
a post-combustion processing system configured to process the flue gas and including:
a carbon dioxide scrubber for receiving the flue gas and contacting the flue gas with a reagent that absorbs carbon dioxide to form a spent absorbent reagent,
a primary stripper for receiving the spent absorbent reagent and stripping at least a portion of the carbon dioxide from the spent absorbent reagent to form a first regenerated reagent; and
a secondary stripper for receiving the first regenerated reagent and stripping at least a portion of the carbon dioxide from the first regenerated reagent to form a second regenerated reagent, said secondary stripper having a first line to return the second regenerated reagent to the carbon dioxide scrubber to be recycled as the reagent, and a second line to return at least a portion of the carbon dioxide stripped from the first regenerated reagent to the air stream being received by said boiler;
wherein the secondary stripper is configured to receive ambient air of the power plant for contacting the first regenerated reagent with the ambient air, thereby stripping at least a portion of the carbon dioxide from the first regenerated reagent.

2. The power plant of claim 1, wherein the primary stripper is connected to a reboiler that is configured to vaporize the spent absorbent reagent into reagent steam and supply the reagent steam to the primary stripper, and the primary stripper is configured to receive the reagent steam and contact the spent absorbent reagent with the reagent steam, whereupon at least a portion of the carbon dioxide is stripped from the spent absorbent reagent, thereby forming the first regenerated reagent.

3. A power plant comprising:
a boiler configured to receive fuel, feed-water, and an air stream, to combust the fuel, vaporizing the feed-water into steam, and to discharge a flue gas that includes carbon dioxide;
a steam turbine configured to receive the steam wherein the steam drives a load and said steam turbine discharges spent steam;
a post-combustion processing system configured to process the flue gas and including:
a carbon dioxide scrubber for receiving the flue gas and contacting the flue gas with a reagent that absorbs carbon dioxide to form a spent absorbent reagent,
a primary stripper for receiving the spent absorbent reagent and stripping at least a portion of the carbon dioxide from the spent absorbent reagent to form a first regenerated reagent; and
a secondary stripper for receiving the first regenerated reagent and stripping at least a portion of the carbon dioxide from the first regenerated reagent to form a second regenerated reagent, said secondary stripper having a first line to return the second regenerated reagent to the carbon dioxide scrubber to be recycled as the reagent, and a second line to return at least a portion of the carbon dioxide stripped from the first regenerated reagent to the air stream being received by said boiler; and
a stripper heat recovery unit configured to receive said first regenerated reagent and vapors evolved from said primary stripper whereby heat is recovered from said vapors in said first regenerated reagent.

4. The power plant of claim 3, further including a compressor, said compressor receiving vapors from said primary stripper and compressing said vapors for downstream utilization or sequestration.

5. The power plant of claim 4 further including a rich-lean crossover heat exchanger for exchanging heat between said spent absorbent reagent and said first regenerated reagent between said primary stripper and said secondary stripper.

6. A power plant comprising:
a boiler configured to receive fuel, feed-water, and an air stream, to combust the fuel, vaporizing the feed-water into steam, and to discharge a flue gas that includes carbon dioxide;
a steam turbine configured to receive the steam wherein the steam drives a load and said steam turbine discharges spent steam;
a post-combustion processing system configured to process the flue gas and including:
a carbon dioxide scrubber for receiving the flue gas and contacting the flue gas with a reagent that absorbs carbon dioxide to form a spent absorbent reagent,
a primary stripper for receiving the spent absorbent reagent and stripping at least a portion of the carbon dioxide from the spent absorbent reagent to form a first regenerated reagent; and
a secondary stripper for receiving the first regenerated reagent and stripping at least a portion of the carbon dioxide from the first regenerated reagent to form a second regenerated reagent, said secondary stripper having a first line to return the second regenerated reagent to the carbon dioxide scrubber to be recycled as the reagent, and a second line to return at least a portion of the carbon dioxide stripped from the first regenerated reagent to the air stream being received by said boiler;
a condenser configured to receive said spent stream and a coolant, whereupon said spent stream is condensed to form feed-water and said coolant is warmed to form a warmed coolant;
at least one heat exchanger for exchanging heat that is associated with one or more processes of the power plant; and
a cooling tower for receiving warmed coolant, cooling air that includes moisture and a water-lean desiccant, said cooling tower configured for contacting said water-lean desiccant with cooling air thereby stripping at least a portion of the moisture from the cooling air to form dried cooling air and a water rich desiccant;

wherein the dried cooling air contacts and cools the warmed coolant, the water-rich desiccant is discharged to the heat exchanger and heated at the heat exchanger to form a water-lean desiccant and the water-lean desiccant is returned to said cooling tower wherein the at least one heat exchanger includes a stripper heat recovery unit configured for receiving said first regenerated reagent, water-rich desiccant from said cooling tower and vapors evolved from said primary stripper whereby heat is recovered from said vapors in said first regenerated reagent and said water-rich desiccant.

7. The power plant of claim 6, further including a water-lean desiccant regeneration unit, said water-rich desiccant being directed serially from said cooling tower through said stripper heat recovery unit and (b) said water-lean desiccant regeneration unit where water is removed from said water-rich desiccant to form said water-lean desiccant that is then returned to said cooling tower.

8. The power plant of claim 7 wherein said water-lean desiccant regeneration unit includes a scavenging air inlet.

9. The power plant of claim 8 wherein said scavenging air inlet is connected to a source of flue gas.

10. A power plant comprising:
a boiler that produces steam;
a steam turbine driven by said steam;
a post-combustion processing system including
  (a) a carbon dioxide scrubber for contacting flue gas received from said boiler with a reagent that absorbs carbon dioxide;
  (b) a primary stripper; and
  (c) a secondary stripper downstream from said primary stripper and upstream from said carbon dioxide scrubber;
a feed-water regeneration system configured for converting spent steam from said steam turbine to feedwater for said boiler, said feedwater regeneration system including: (a) a cooling tower and (b) a water-lean desiccant regeneration unit; and
a heat exchanger configured for removing heat from vapors evolved from said primary stripper; wherein said heat exchanger includes a water-rich desiccant inlet and a heated water-rich desiccant outlet.

11. A power plant comprising:
a boiler that produces steam;
a steam turbine driven by said steam;
a post-combustion processing system including
  (a) a carbon dioxide scrubber for contacting flue gas received from said boiler with a reagent that absorbs carbon dioxide;
  (b) a primary stripper; and
  (c) a secondary stripper downstream from said primary stripper and upstream from said carbon dioxide scrubber;
a feed-water regeneration system configured for converting spent steam from said steam turbine to feedwater for said boiler, said feedwater regeneration system including: (a) a cooling tower and (b) a water-lean desiccant regeneration unit; and
a heat exchanger configured for removing heat from vapors evolved from said primary stripper; wherein said heat exchanger includes a first regenerated reagent inlet and a reheated first regenerated reagent outlet.

12. A power plant comprising:
a boiler that produces steam;
a steam turbine driven by said steam;
a post-combustion processing system including
  (a) a carbon dioxide scrubber for contacting flue gas received from said boiler with a reagent that absorbs carbon dioxide;
  (b) a primary stripper; and
  (c) a secondary stripper downstream from said primary stripper and upstream from said carbon dioxide scrubber;
a feed-water regeneration system configured for converting spent steam from said steam turbine to feedwater for said boiler, said feedwater regeneration system including: (a) a cooling tower and (b) a water-lean desiccant regeneration unit; and
a heat exchanger configured for removing heat from vapors evolved from said primary stripper; wherein said heat exchanger includes a water-rich desiccant inlet and a heated water-rich desiccant outlet and a first regenerated reagent inlet and a reheated first regenerated reagent outlet.

* * * * *